P. M. RAINEY.
RECTIFIER.
APPLICATION FILED JAN. 4, 1918.

1,307,517.

Patented June 24, 1919.

Inventor:
Paul M. Rainey
by J.G. Roberts
Att'y

UNITED STATES PATENT OFFICE.

PAUL M. RAINEY, OF GLEN RIDGE, NEW JERSEY, ASSIGNOR TO WESTERN ELECTRIC COMPANY, INCORPORATED, OF NEW YORK, N. Y., A CORPORATION OF NEW YORK.

RECTIFIER.

1,307,517.  Specification of Letters Patent.  Patented June 24, 1919.

Application filed January 4, 1918.  Serial No. 210,257.

*To all whom it may concern:*

Be it known that I, PAUL M. RAINEY, a citizen of the United States, residing at Glen Ridge, in the county of Essex, State of New Jersey, have invented certain new and useful Improvements in Rectifiers, of which the following is a full, clear, concise, and exact description.

This invention relates to electrical rectifiers, that is, to devices for producing direct current from an alternating current source, and is particularly concerned with rectifiers of the mechanical type wherein a contact-making device is employed to connect the direct current circuit with the alternating current source intermittently at the proper instants in the alternating current cycle to produce a unidirectional flow in the said circuit.

The object of the invention is to produce this commutation of the alternating current at the instant the alternating current is passing through zero.

To bring about this commutation of the alternating current, the invention provides a polarized pole-changing electromagnet whose contacts are arranged to reverse the connections of the direct current circuit to the alternating current supply periodically in isochronism with the reversals of the alternating current. The operation of this pole-changing electromagnet is controlled by a polarized relay in circuit with the alternating current source. The polarized relay is equipped with an auxiliary winding connected in a local circuit controlled by the relay contacts and whose electrical constants can be adjusted so to govern the operation of the relay, that commutation of the alternating current will take place at the instant the current passes through zero.

Figure 1:
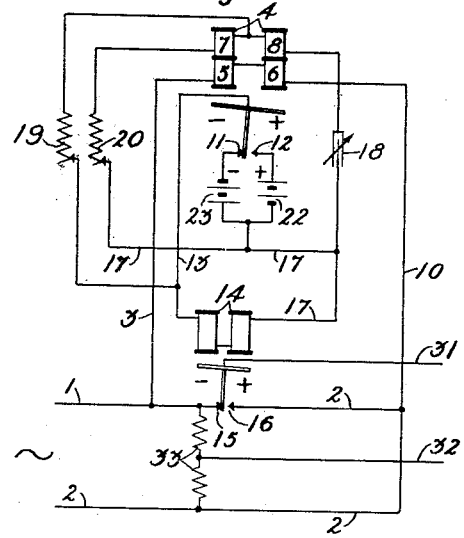
Figure 2:
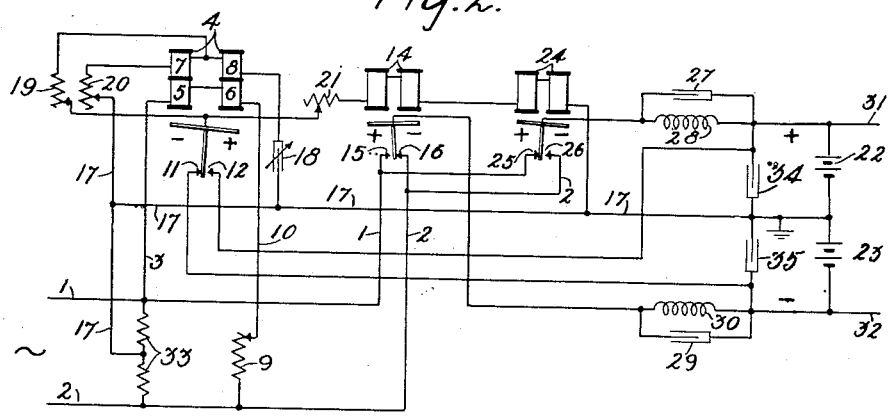
Figure 3:
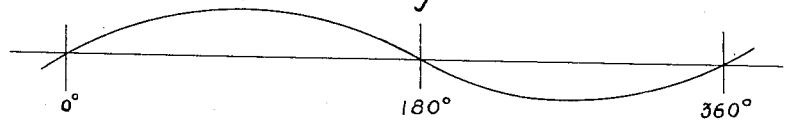

The invention will be better understood by referring to the accompanying drawings, in which Figure 1 illustrates one embodiment of the invention wherein the voltage of a half-cycle is used to produce a unidirectional current flow in the direct current circuit, while Fig. 2 illustrates an arrangement whereby the potential difference of a complete cycle (that is, double the half-wave voltage) is made available and applied to the charging circuit of a storage battery. Fig. 3 shows a simple sine wave.

In describing the operation of this system two conductors indicated by the reference numerals 1 and 2 may be understood as connected with a suitable source of alternating current, say of sine wave form, while the conductors 31 and 32 may be understood as representing a direct current work circuit such as may be employed in charging storage cells or for the operation of suitable direct current devices. Alternating current from a conductor 1 traverses a circuit over a conductor 3, windings 5 and 6 of a polarized relay 4, and a conductor 10 to the opposite alternating current conductor 2. In phase with the changes in polarity of the alternating current through the windings 5 and 6 the armature of this relay will be reciprocated alternately to engage its contacts 11 and 12. This action results in the completion of three circuits from battery 23, one by way of conductor 13, polar relay 14 and conductor 17 to the opposite side of battery 23, a second by way of conductor 13, adjustable resistance 19, winding 7 of relay 4, and adjustable resistance 20 back to battery 23, and a third by way of conductor 13, resistance 19, winding 8 of relay 4 and adjustable condenser 18 back to battery. Current through the relay 14 as first traced will bias the armature of this relay to close its contacts 15, thereby completing a connection from the alternating current lead 1 to the direct current lead 31, and after passing through the direct current devices already assumed, this circuit returns by way of a conductor 32 to an intermediate point on an auto-transformer coil 33 which is placed in bridge of the alternating current leads 1 and 2. It will be obvious that this impulse of current, after reaching the mid-point of the coil 33, will traverse the lowermost part of this unit to the alternating current lead 2. It may be mentioned that the assumed position of the relays 4 and 14 would be effective during an interval corresponding with a half-wave current of negative polarity. Therefore, the last half wave of such cycle would establish opposite bias of the relay 4, thereby closing the contacts 12 to connect the positive pole of a battery 22 through the relay 14 and the adjustable resistance 19 as already traced for the negative wave. Current from the battery 22 causes the relay 14 to close its contacts 16, thereby connecting the alternating current lead 2 with the direct current conductor 31, whence the half waves of alternating current may reach the direct current conductor 32 and traverse the uppermost portion of the coil 33 to the alternating current lead 1.

Referring more particularly to the relay 4, it will be clear that on the instant the armature of this relay closes either its contact 11 or its contact 12, the respective batteries 23 or 22 will charge the condenser 18 through the winding 8 of this relay, and the adjustable resistance 19, and that so long as either contact of the relay 4 is maintained, current from the corresponding battery will be established through the variable resistance 20, the relay winding 7 and the variable resistance 19. Condenser 18 should preferably be of an adjustable type, therefore, by varying this capacity, and by means of the variable resistances 19 and 20, adjustments may be secured whereby operation of the relay 4 may be varied to suitably lead with respect to the zero current moments of the driving alternating current supplied over the leads 1 and 2.

At the instant the condenser 18 receives a charge, such current acts differentially in the coil 8 to overcome the effect of steady current at the same moment in the coil 7, and therefore the armature of this relay will be favorably affected at such instants. At the instant the armature of the relay 4 separates from one of its contacts, and before it reaches the opposite contact, the condenser 18 will discharge in a closed loop circuit formed through the windings 7 and 8 and the adjustable resistance 20, by way of the bus-conductor 17. This discharge will be in phase or accumulative with an alternation of current present at the same instant in the windings 5 and 6, thereby aiding the force which is then moving the armature of this relay and accelerating its movement.

It will be pointed out that the condenser 18 and the resistance 20 may be transposed with respect to their positions in the present circuits, thereby reversing the relation of the self-aiding effects to cause the armature of the relay 4 to lag with respect to the periods of the alternating current. This will be clear since the discharge of the condenser 18 through the windings 7 and 8 and the resistance 20 would oppose the effect of the alternating current in the windings 5 and 6. In this case the resistance 20 should be adjusted to such point that steady current through the coil 8 would be equal to or predominate over the condenser charging current through the winding 7. It may also be mentioned that ordinarily a condenser of fixed value may be employed when the associated resistance 20 is of an adjustable type, or conversely the resistance 20 may be fixed or non-adjustable in case the condenser 18 is of an adjustable type.

Since the relay 14 is under control of the relay 4 the adjustments of the vibrating circuits of the compound wound relay, permit close adjustments whereby the armature of the relay 14 may be controlled to move coincident with the zero current moments of the alternating current.

From the foregoing description, it will be clear that for a given wave of alternating current similar to that shown in Fig. 3 of the drawing, the armature of the relay 14 will be active at the zero degree and the 180° points or moments of the current waves.

Fig. 2 shows an arrangement for charging the batteries 22, 23 from the alternating current source, these batteries also being used to supply current for the auxiliary or vibrating circuit of the relay 4. Two pole-changing relays 14 and 24 are here employed, each controlling one side of the direct current circuit and together forming in effect a two-pole, two-way reversing switch. Therefore, during the time these relays are in a position in which they are shown, an impulse of alternating current may be traced from the alternating current lead 1, by way of the contacts 25 of the relay 24 and inductance 28 to the positive pole of the battery 22. From the opposite side of this battery the circuit continues either to the ground, or in the absence of a corresponding ground on the alternating current system, by way of the bus-conductor 17, to a central point on the coil 33, thence through the lowermost portion of this coil to the alternating current lead 2. A second circuit may be traced from the alternating current lead 2 by way of contact 16 of the relay 14, inductance 30 to the negative side of the battery 23, thence by way of the bus-conductor 17 and the uppermost portion of the unit 33 to the alternating current lead 1. In a reciprocal manner opposite bias of the armatures of the relays 14 and 24 establishes a next half wave of corresponding polarity respectively with the batteries 22 and 23.

For convenience in the present arrangement the batteries 22 and 23 have been employed for controlling the self-aiding circuits of the relay 4 and also for operation of the relays 14 and 24. In the present position of the relays, a circuit whereby the relays 14 and 24 are operated may be traced from the negative side of the battery 23, contacts 11 of the relay 4, an adjustable resistance 21, thence in series through the windings of the relays 14 and 24 to the opposite side of the battery 23. During an opposite bias of the armature of the control relay 4, a circuit may be traced from the positive side of the battery 22, the contacts 12 of the relay 4, and the circuit already traced through the resistance 21, the serially connected relays 14

14 and 24, and bus-conductor 17 to the opposite side of the battery 22.

In order to suitably adjust the driving current through the windings 5 and 6 of the relay 4, a variable resistance 11 has been provided in series with the alternating current circuit, while an adjustable resistance 21 has been provided in series with the relays 14 and 24, in order that suitable adjustments may be established in the operating circuit of these relays. It will be understood that an adjustable resistance as the resistance 9 may be connected in series with the windings 5 and 6 of the relay 4 in the first figure of the drawing and that an adjustable resistance as the resistance 21 may be connected in circuit with the windings of the relay 14 in the first figure, all for adjusting purposes as mentioned for these resistances in connection with the second figure of the drawing.

Condensers 34 and 35 should preferably be inserted as shown to prevent sparking at the contacts of the relay 4. Similarly, condensers 27 and 29 serve to prevent sparking at the contact of relays 14 and 24 and also coöperate with inductances 28 and 30 to prolong the current flow to the batteries 22 and 24 during the change-over period.

What is claimed is:

1. In a current rectifier, a source of alternating currents, a first electroresponsive means operated by said alternating currents, sources of direct current, means responsive to said direct currents for aiding said alternating currents in operating said electroresponsive means, a second electroresponsive means controlled by said first electroresponsive means, and means controlled by said second electroresponsive means for rectifying said alternating currents into direct current.

2. In a current rectifier, a polarized relay, a plurality of windings for said relay, a source of alternating currents effective with certain of said windings to operate said relay, sources of direct current, means to render said sources of direct current effective with other of said windings to aid the alternating currents in the operation of said relay, a second polarized relay controlled by said first mentioned relay, and means controlled by said second relay for translating said alternating currents into direct current.

3. In a current rectifier system, a source of alternating current, a first relay responsive to said alternating currents, means for aiding said alternating currents in operating said relay, a plurality of inversely responsive relays controlled by the first relay, and means controlled by said plurality of relays for translating said alternating currents into direct current.

4. In a mechanical current rectifier, a source of alternating currents, sources of direct current, a polarized relay responsive to said alternating currents, means to render said direct current effective to aid said alternating currents in the operation of said relay, a plurality of polarized relays inversely responsive to said first mentioned relay, and means controlled by said plurality of relays for converting said alternating currents into direct current.

5. In a current rectifier system, a source of alternating current, sources of direct current, a first polarized relay responsive to said alternating currents, a plurality of polarized relays controlled by said first relay, means controlled by said plurality of relays for translating said alternating currents into direct current, means to render said direct currents effective to aid said alternating currents in the operation of said first relay, and means for varying the electrical time constant of said aiding means to establish a predetermined phase relation between the alternating currents and the operation of said relays.

6. The method of rectifying alternating currents into direct current, which consists in providing a polarized relay with means to vary its time constant of operation with respect to the frequency of the alternating current by which the relay may be operated, and in providing other polarized relay means to be controlled by said first mentioned relay for translating the alternating currents into direct current.

In witness whereof, I hereunto subscribe my name this 29th day of December A. D., 1917.

PAUL M. RAINEY.